Oct. 26, 1926.
J. LAURIER
1,604,923
AUTO TRACTION DEVICE
Filed July 27, 1925      3 Sheets-Sheet 1
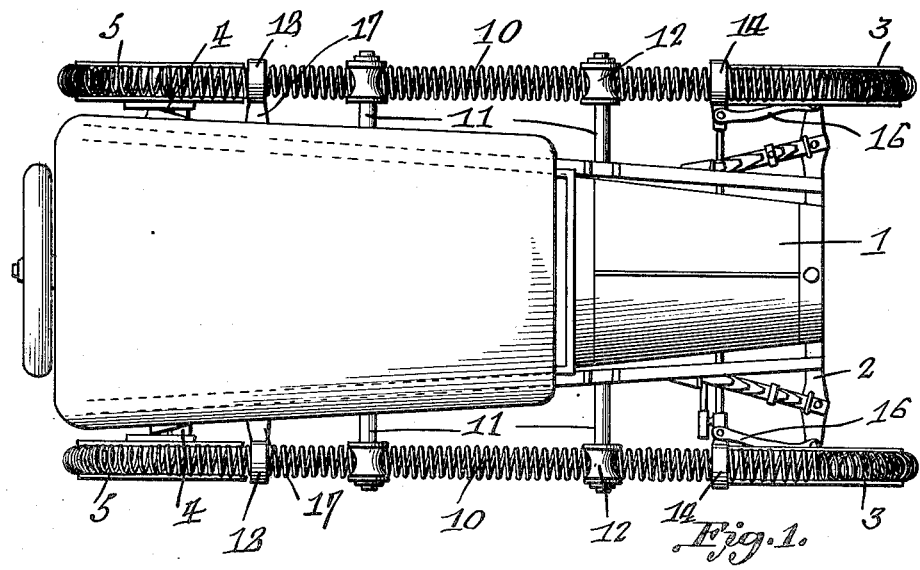
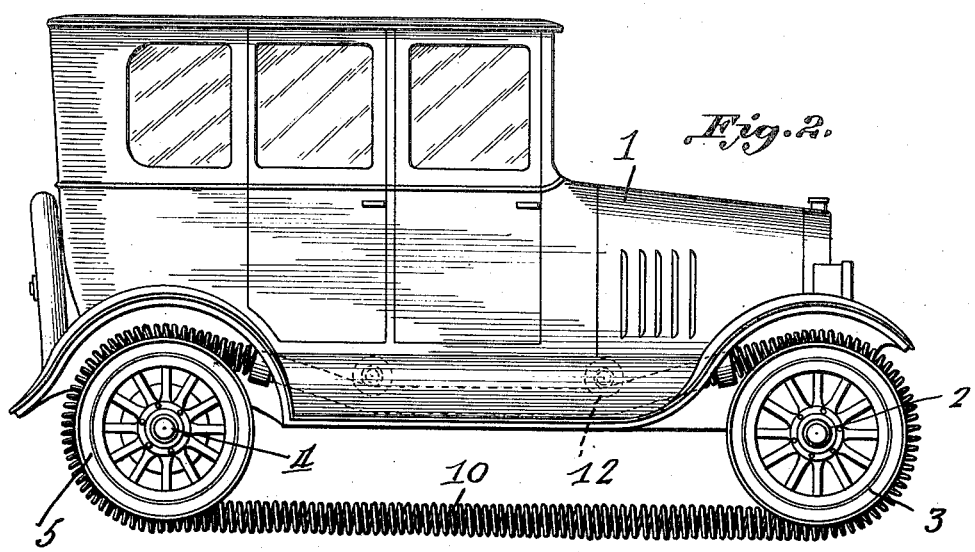
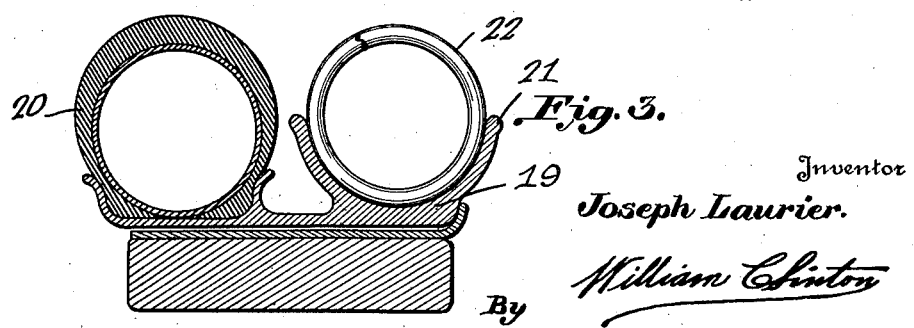
Inventor
Joseph Laurier.
By William Clinton
Attorney Oct. 26, 1926.
J. LAURIER
1,604,923
AUTO TRACTION DEVICE
Filed July 27, 1925
3 Sheets-Sheet 2
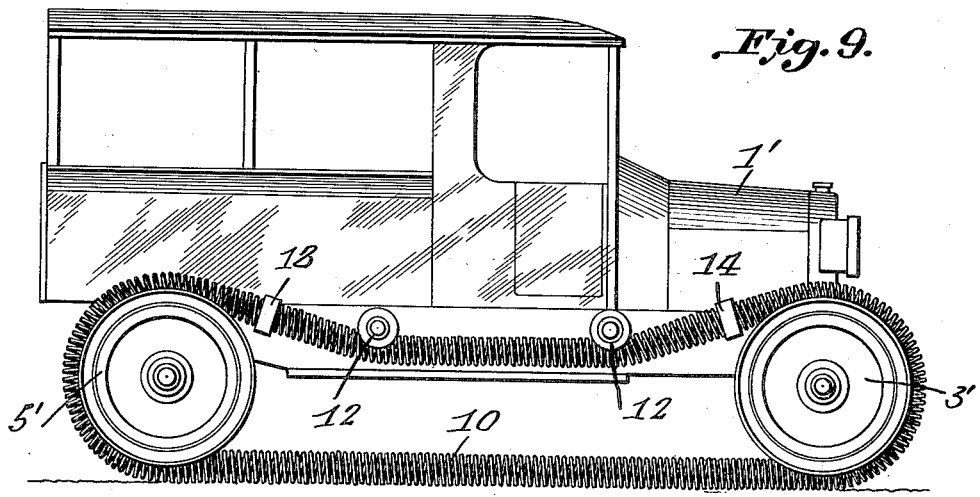
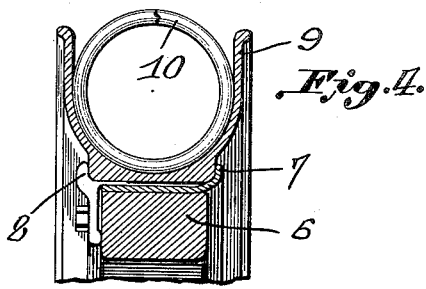
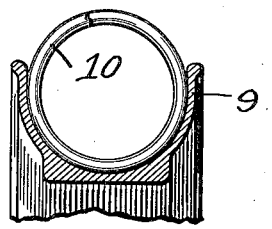
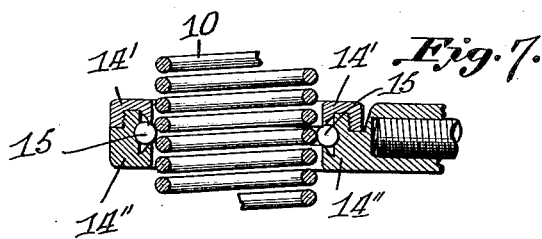
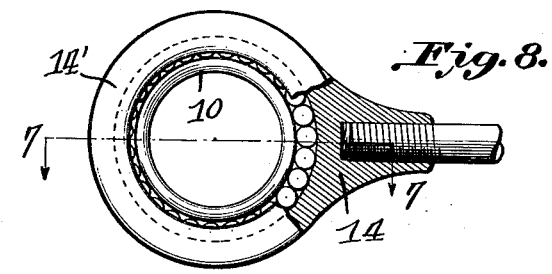
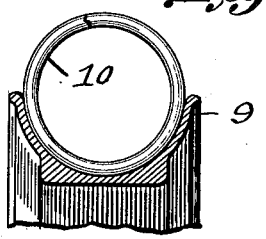
Inventor
Joseph Laurier.
William Clinton
By
Attorney Oct. 26, 1926.  
J. LAURIER  
1,604,923  
AUTO TRACTION DEVICE  
Filed July 27, 1925   3 Sheets-Sheet 3
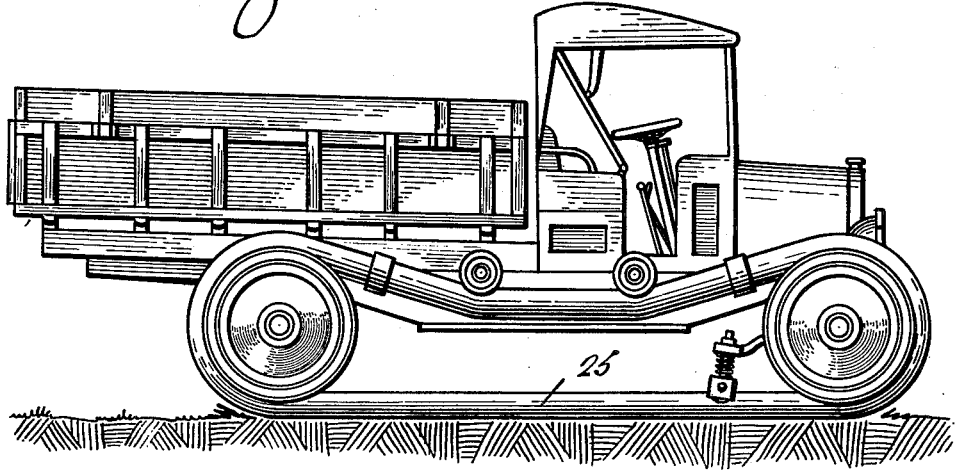
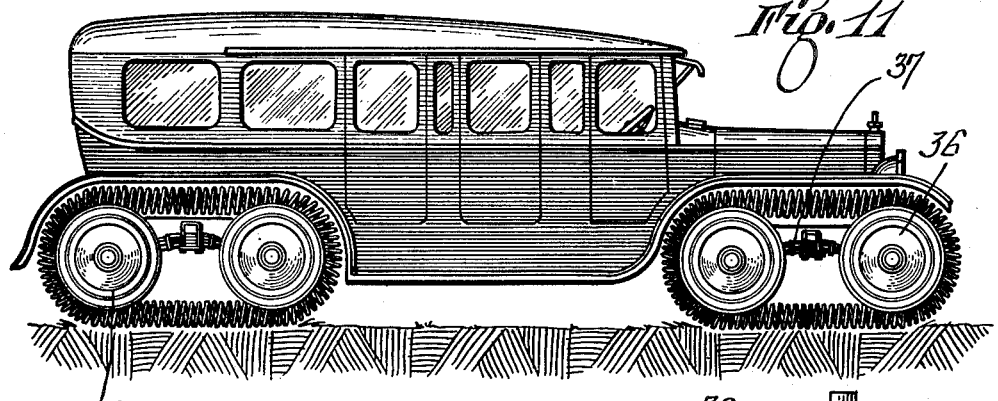
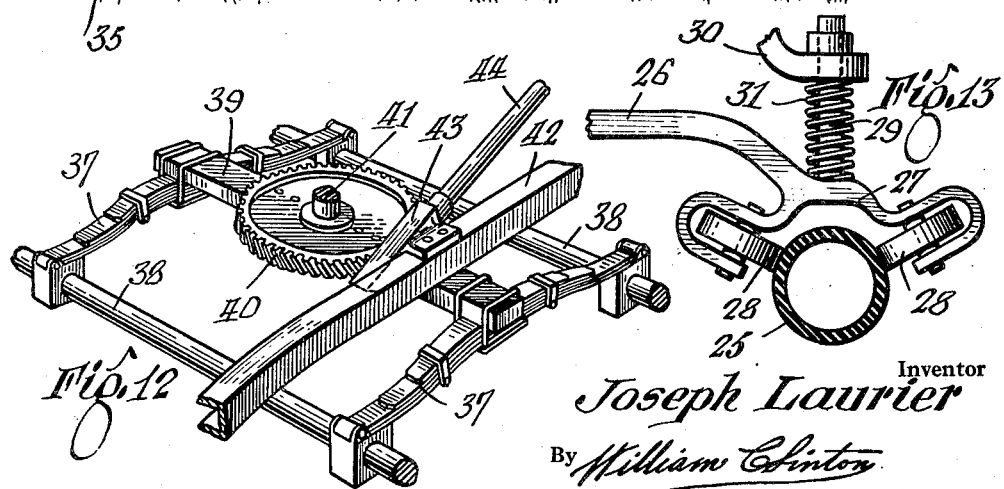
Inventor  
Joseph Laurier  
By William Clinton  
Attorney Patented Oct. 26, 1926.

1,604,923

UNITED STATES PATENT OFFICE.

JOSEPH LAURIER, OF MONTREAL, QUEBEC, CANADA.

AUTO TRACTION DEVICE.

Application filed July 27, 1925. Serial No. 46,393.

The present invention pertains to a novel traction device for automobiles, designed to improve the riding qualities of such vehicles.

The invention consists, for this purpose, in passing a continuous coil spring over each forward and rear wheel. The movement of the rear wheels thus sets the springs in motion, and since the latter rest on the ground, the vehicle is propelled. Due to the resiliency of the springs, the vehicle permanently rests on a cushion support during its travel.

The invention provides further for a number of supporting collars secured to the vehicle and surrounding the springs. Two of these collars are carried by the ends of the steering tie rod, whereby the springs are shifted corresponding to the steering of the front wheels.

The coil springs usually replace the rubber tire, but may also be used in conjunction with the tires. In such a construction, each wheel carries a double rim having two sections. One section of each rim supports a rubber tire of the usual character, while the remaining sections support the coil springs in the manner already described.

The invention is fully disclosed in the following description and in the accompanying drawings in which:

Figure 1 is a plan view of an automobile having the device of the invention applied thereto, the mud guards being removed to show the invention;

Figure 2 is a side elevation corresponding to Figure 1 with the mud guards in place;

Figure 3 is a sectional view of a modified form of wheel;

Figure 4 is a sectional view of a wheel for heavy loads;

Figure 5 is a similar section of the wheel for medium loads;

Figure 6 is a similar section of the wheel for light loads;

Figure 7 is a diametrical section through one of the supporting collars and springs passed therethrough, taken on the line 7—7 of Figure 8;

Figure 8 is a plan view, partly in section, of one of the forward spring supporting collars;

Figure 9 is a side elevation of a truck having the device of the invention applied thereto;

Figure 10 is an elevation of a modified construction;

Figure 11 is an elevation of the invention applied to a motor bus;

Figure 12 is a detail perspective view of the steering mechanism for the device shown in Figure 11; and Figure 13 is a detail of the guide for the tread member shown in Figure 10.

Reference will now be made to these views by means of like characters which are employed to designate corresponding parts throughout.

The numeral 1 indicates in general an automobile which may be of any desired make or construction. The vehicle comprises a forward axle 2 carrying front wheels 3 and rear axle 4 on which are mounted the rear wheels 5.

Each wheel comprises a felloe 6 surrounded by a clincher rim 7 and locking ring 8. The members 7 and 8 instead of supporting a tire, retain a channeled case 9 of annular configuration as shown in Figures 4, 5 and 6. A coil spring 10 is passed over each forward and rear case, as shown in Figures 1 and 2.

A pair of shafts 11 are passed transversely through the bottom of the vehicle and support rollers 12 at their ends which engage the upper lap of each spring as shown in Figure 2. These rollers serve to hold the spring taut without injuring the movement thereof. The steering tie rod is extended as shown in Figure 1 and has collars 14 threaded over its ends, as illustrated in detail in Figure 8. Each collar is formed in two parts 14' and 14", whereby a series of ball bearings 15 may be supported therebetween. The springs 10 pass through the collars and engage the ball bearings 15 so that only very slight frictional resistance to the movement of the springs is caused.

To the extremities of the tie rod are secured steering fingers 16 which are connected to the ends of the front axle in the usual manner. Due to the provision of the collars 14 on the tie rod 13, the springs are shifted corresponding to the steering vehicle.

A pair of bracket 17 are secured near the rear ends of the vehicle and carry collars 18 similar to the members 14. The springs 10 pass through these collars also which serve to retain and guide the springs.

In Figure 3 is shown a modified type of wheel having a double rim 19. One of the sections of the rim carries a usual tire 20, while the remaining section is channeled as at 21 for the accommodation of a spring 22 in the manner already described with reference to Figures 1 and 2.

The depth of the channel varies in accordance with the load to be carried by a vehicle. For example, for heavy loads the depth of the channel is nearly equal to the diameter of the spring, as shown in Figure 4. The construction for medium loads is shown in Figure 5, the channel being of less depth. A channel of still less depth for light loads is shown in Figure 6. It will be seen that the channel is deeper for heavier loads in order to provide firmer retaining means for the springs.

Heavy vehicles would ordinarily require a heavy traction spring which would be difficult to bend in steering the front wheels. In such cases the tread member may be replaced by a solid rubber band 25 or an inflated rubber tube passing over the wheels as shown in Figure 10.

In order to aid the bending of the tread member in steering the front wheels, a guide frame is provided as shown in detail in Figure 13. This member consists of a transverse bar 26 disposed immediately behind the front wheels and carrying at each end a pair of brackets 27. Each bracket supports a roller 28 so that a pair of rollers engage each tread member 25 as shown in Figure 13. At each end of the bar 26 is formed an upright pin 29 to which is attached a finger 30. The two fingers projecting from the two pins 29 are secured to the spindle arms or to the ends of the spindle connecting rods of the usual steering mechanism. Each pin 29 is surrounded by a spring 31 disposed between the finger 30 and the corresponding end of the bar 26 in order to provide a cushioning effect at its region. The spindle arms and spindle connecting rod above referred to constitute parts of the steering parallelogram, and since the guide frame is secured thereto it moves in unison with the front wheels and remains in alinement therewith at all times. Consequently, when the front wheels are steered, the guide frame moves with them and aids in bending the tread member 25.

Figure 11 illustrates the invention applied to a passenger bus which is of such length that two sets of wheels are required at each end. In this instance a tread member 35 is trained over the alined wheels of each pair in such a manner that two treads are provided at each side of the vehicle, one at each end. The forward wheels 36 are carried on a truck consisting of a pair of parallel springs 37 and a pair of axles 38 mounted at the ends of the springs. The wheels 36 are carried by these axles. A cross bar 39 is placed over the springs 37 and secured thereto in parallel relation to the axles 38. To the bar is secured a worm gear 40 into which enters a spindle 41 secured to a fixed part of the vehicle and around which the truck is rotatable. The chassis 42 has secured thereto a box 43 which lies adjacent the worm gear. The steering rod 44 projects towards the box and carries a worm (not shown) journaled within the box and meshing with the worm gear 40. When the steering rod is rotated, the gear 40 and the frame secured to it are caused to move whereby the front wheels 36 mounted on the axles 38 are adjusted.

Although the drawing shows my invention adapted on an automobile it might as well be used for any other vehicles. Also, if desired, the spring may be replaced by a flexible tube or the like.

While specific embodiments of the invention have been illustrated and described, it is to be understood that various alterations in the details of construction may be made without departing from the spirit of the invention as indicated by the appended claims.

Having thus fully described the invention, what I claim as new and desire to protect by Letters Patent is:—

1. In combination with the wheels of a vehicle and an endless tread member passed over each forward and rear wheel, a guide movable with the forward wheels and engaging said tread member.

2. In combination with the wheels of a vehicle and an endless tread member passed over each forward and rear wheel, a guide comprising collars carried by the steering tie rod of the vehicle and surrounding said members, and ball bearings provided within said collars and engaging the tread members.

3. In combination with the wheels of a vehicle and an endless tread member passed over each forward and rear wheel, a guide comprising collars carried by the steering tie rod of the vehicle and surrounding said members, ball bearings provided within said collars and engaging the tread members, a transverse shaft supported by the vehicle, and rollers carried at the ends of said shaft, said rollers engaging the upper lap of each tread member.

In witness whereof I have hereunto set my hand.

JOSEPH LAURIER.